(12) United States Patent
Elliot et al.

(10) Patent No.: US 7,578,873 B2
(45) Date of Patent: Aug. 25, 2009

(54) PERMEABLE CONTAINER RECEIVING A VOLATILE AGENT FOR AIR TREATMENT, IN PARTICULAR OF A VENTILATING, HEATING AND/OR AIR CONDITIONING INSTALLATION OF A VEHICLE

(75) Inventors: Gilles Elliot, Courcouronnes (FR); Frederic Giraud, Le Perray en Yvelines (FR); Frederic Ladrech, Maurepas (FR)

(73) Assignee: Valeo Systemes Thermiques S.A.S., Le Mesnil, Saint Denis (FR)

( * ) Notice: Subject to any disclaimer, the term of this patent is extended or adjusted under 35 U.S.C. 154(b) by 560 days.

(21) Appl. No.: 11/296,102

(22) Filed: Dec. 7, 2005

(65) Prior Publication Data

US 2006/0123992 A1    Jun. 15, 2006

(30) Foreign Application Priority Data

Dec. 9, 2004  (FR) .................................. 04 13129

(51) Int. Cl.
*B01F 3/04*  (2006.01)

(52) U.S. Cl. ...................... 96/222; 261/95; 261/DIG. 88
(58) Field of Classification Search .................. 96/108, 96/222; 261/94, 95, 101, DIG. 88
See application file for complete search history.

(56) References Cited

U.S. PATENT DOCUMENTS

| | | | | |
|---|---|---|---|---|
| 2,578,827 | A | * 12/1951 | Munnecke | ................... 239/55 |
| 4,356,969 | A | 11/1982 | Obermayer et al. | |
| 4,523,870 | A | * 6/1985 | Spector | ....................... 454/157 |
| 4,961,493 | A | 10/1990 | Kaihatsu | |
| 6,029,901 | A | 2/2000 | Toy, II | |
| 2002/0197187 | A1 | 12/2002 | Muray | |

* cited by examiner

*Primary Examiner*—Robert A Hopkins
(74) *Attorney, Agent, or Firm*—Howard & Howard Attorneys PLLC

(57) ABSTRACT

The invention relates to an air treatment device using a volatile treating agent contained inside a permeable container (1), particularly applicable to a ventilating, heating and/or air conditioning installation. The treating agent is a liquid packaged inside a cohesive spongy body (2) occupying the available volume of a chamber (3) formed by an internal hollow of the container (1).

18 Claims, 1 Drawing Sheet

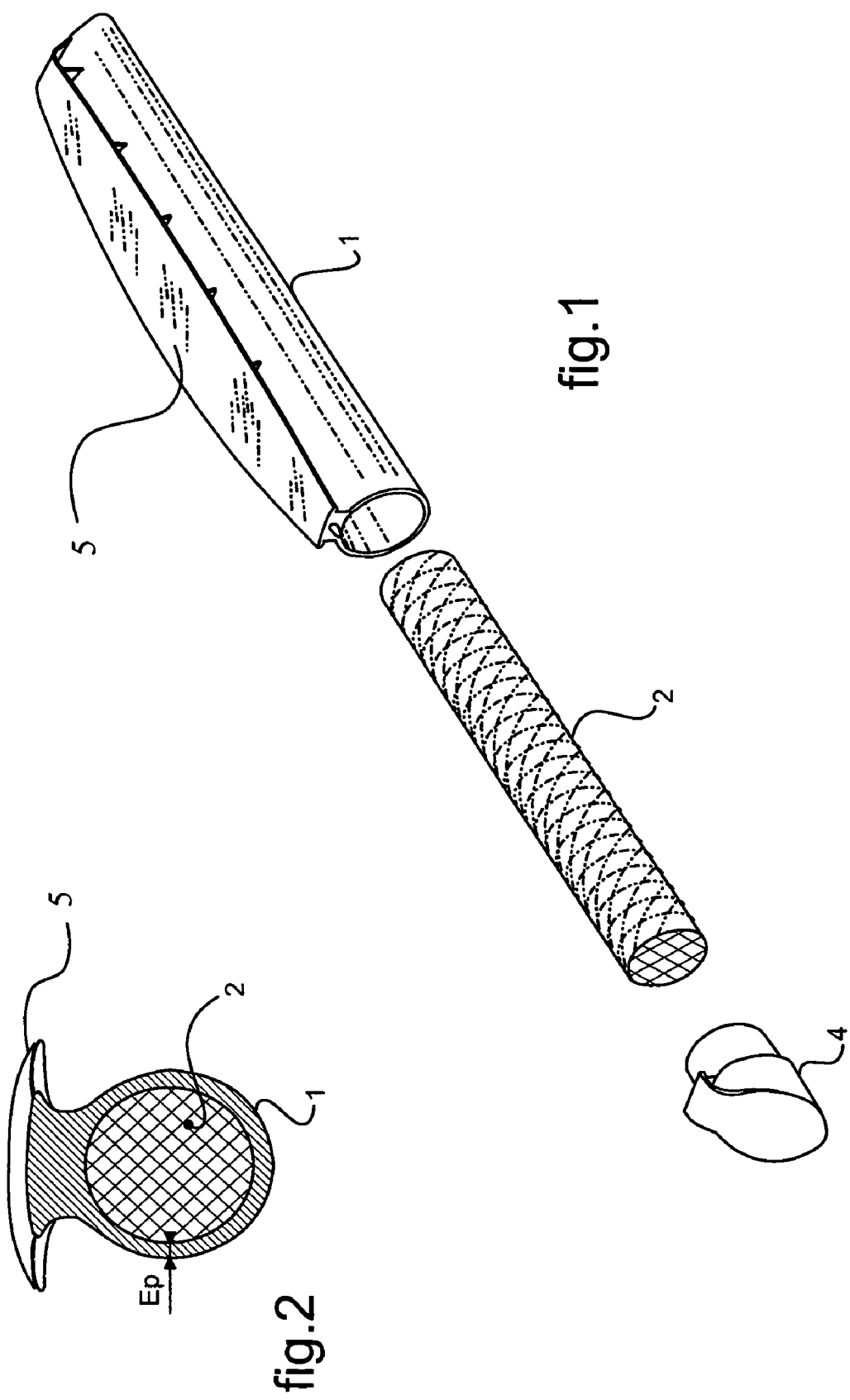

PERMEABLE CONTAINER RECEIVING A VOLATILE AGENT FOR AIR TREATMENT, IN PARTICULAR OF A VENTILATING, HEATING AND/OR AIR CONDITIONING INSTALLATION OF A VEHICLE

TECHNICAL FIELD OF THE INVENTION

The invention relates to the field of air disinfection, sterilisation and/or deodorisation, and is particularly applicable to ventilating, heating and/or air conditioning installations for a vehicle passenger compartment more particularly. Its subject is an air treatment device using a volatile treating agent housed inside a permeable container, in particular in order to treat the air circulating through such an installation.

PRIOR ART

Air treatment devices that use a volatile treating agent, placed inside a permeable container, for a gradual diffusion of treating agent through the wall of the container over a given period, are known. This treatment is for example a fungicide, anti-bacterial or fragrance treatment.

According to a first known solution, the treating agent is a liquid contained inside a gas permeable pouch impermeable to liquid, itself packaged inside an impermeable container which is withdrawn at the time the device is to be used. Reference may for example be made to the document U.S. Pat. No. 4,961,493 which describes a device of this kind.

Conversely and according to another known solution, the treating agent is a liquid contained inside an impermeable pouch, itself contained in a permeable container. When the device is used, the impermeable pouch is broken in order to release the treating agent inside the permeable container. Reference may for example be made to the document U.S. Pat No. 5,458,244 which describes a device of this kind.

The problem posed is the durability of the treatment over a period which should be as long as possible. It has been proposed to mix the treating agent in a liquid state with a gel substance, and to package the mixture obtained inside one or more permeable pouches deposited inside a permeable container. Reference may be made for example to the document EP 1440696 which describes a device of this kind. Such devices are used particularly to treat the air circulating inside a vehicle ventilation, heating and/or air conditioning installation. In a known way, the permeable container receiving the pouches is placed inside the installation, being anchored to a passenger compartment filter, for example.

Such devices should take up a small amount of space for the longest lifetime and the most stable diffusion possible. In practice however, the use of a gel substance has proved not to be satisfactory. Indeed, the volume required to package the treating agent mixture mixed with the gel substance inside the pouch requires a large container to receive the pouches. Additionally, the pouch may not occupy all the available space in the container, with a consequential loss in its effective volume. Finally, the use of such a technique for packaging the treating agent involves, for a given thickness of the container, a significant permeable surface of this container to allow satisfactory diffusion of the treating agent mixed with the gel substance.

SUBJECT OF THE INVENTION

The purpose of the present invention is to propose an air treatment device using a volatile treating agent contained inside a permeable container, which offers a satisfactory, stable and durable diffusion of the treating agent while optimising the surface available for the diffusion of the treating agent through the container in order finally to reduce its overall space requirement.

Such a device is particularly intended to be applied to a vehicle ventilation, heating and/or air conditioning installation, taking into account the constraints on the use and installation of the device inside such an installation, particularly in respect of the space requirement of the device which needs to be as small as possible, the reliability, durability and stability of the diffusion of the treating agent, methods for simple installation of the device inside the installation, and particularly to a passenger compartment filter, and of methods for renewing the device if it is expendable, or indeed the treating agent inside the device in the opposite case.

The device of the present invention is an air treatment device using a volatile treating agent contained inside a permeable container. According to the present invention, such a device is notable primarily in that the treating agent is packaged by absorption inside a cohesive spongy body that occupies, at least partially, and advantageously almost all the available volume of a chamber formed by an internal channel of the container.

The occupation by the body of the volume of the chamber is optimum, preferentially with the exception of a thin layer of air provided between the body and the wall of the chamber in order on the one hand to facilitate the introduction of the body inside the chamber, and on the other hand to promote the release of the treating agent.

The treating agent is preferably kept in a liquid state in order to promote its absorption by the cohesive spongy body. It will be understood however that this arrangement is to be considered with regard to any other similar arrangement, of the gel type for example, the objective being to keep the treating agent in a state in which it is able to be absorbed by the cohesive spongy body.

The result of these arrangements is that keeping the treating agent in a liquid state or similar and packaging it inside the cohesive spongy body allows the space requirement of the unit they form to be reduced, for a reliability of diffusion of the treating agent through the wall of the container which is satisfactory and durable for the smallest possible diffusion surface, and therefore the smallest possible space requirement for the container. These arrangements are particularly advantageous in allowing easy anchoring of the container to a passenger compartment filter, such as a particle filter, activated charcoal filter, combined filter or similar component, while optimising the release property of the treating agent.

This cohesive spongy body is a mass able to be formed from a textile material, such as mixed natural or artificial textile fibres, from a mass of cellulose, such as a thick absorbent pad of the type in the form of a piano key or a long strip, from a body formed of a mineral or vegetable substrate, possibly broken down and compressed, from a cohesive mass of polymer powder, or even from a material of animal origin such as a porous leather.

More particularly if the cohesive spongy body is made out of a textile material, this material is able to be wool, cotton, synthetic microfibres such as polypropylene, or any other natural or artificial textile material.

More particularly again, if the cohesive spongy body is a vegetable material, this material is able to be cellulose wadding, white wood such as fir or pine, chestnut, compressed sawdust, sphagnum peat or any other similar vegetable material.

More particularly again, if the cohesive spongy body is a mineral material, this material is able to be montmorillonite, attapulgite, an earth mixture such as cellulose mixed with china clay, calcined diatomaceous earth, magnesia, lime, metal oxides such as iron or aluminium, silicates, vermiculite, activated charcoal, silica, kieselguhr or any other similar mineral.

The permeable container is in particular a rigid container, preferably fitted with a cap for closing the chamber receiving the cohesive spongy body. In the preferred case where the device is expendable, the cap is installed permanently on the container, with the whole device being replaced after wear and tear. This permanent installation results for example from force-fitting the cap onto the container. According to another alternative, provision is made to assemble the cap reversibly on the container in order to renew the load of treating agent in the device. This renewal is for example implemented by replacing the cohesive spongy body, or by filling the container with treating agent.

This permeable container is in particular formed of a plastic material, such as polypropylene for example, possibly with a talc filler in a proportion of between 0% and 40%, and more particularly of about 20%, for in particular a wall thickness of between 0.5 mm and 2 mm.

Based on this choice, after trials conducted empirically on the basis of the intuitive choices made by designers, it has proved that in order to determine the dimensional characteristics of the container, and particularly the ratio between the thickness Ep and the diffusion surface S of the container, the following rule could be applied in respect of a required annual diffusion X expressed in terms of mg/day:

$$X = 6.05*10^{-8}*S*\exp((0.0452T-15.89)*Ep+0.0451T)$$

wherein:

S is the diffusion surface of the container expressed in $mm^2$,

Ep is the thickness of the container expressed in mm,

T is the average ambient temperature expressed in degrees Kelvin.

The quantity of treating liquid contained in the cohesive spongy body is in this case between 1.82 g and 21.9 g according to the conditions of use of the device.

The invention also targets an air filter for a motor vehicle passenger compartment including a peripheral edge which holds a filtering medium, which is innovative in that the filter comprises an air treatment device according to any one of the previous characteristics.

Advantageously, the air filter is integrated with a motor vehicle passenger compartment ventilation, heating and/or air-conditioning installation.

DESCRIPTION OF THE FIGURES

The present invention will be better understood from reading the description below of an embodiment example thereof, in relation to the figures in the appended drawings, wherein:

FIG. 1 is an exploded perspective view of an air treatment device according to a preferred embodiment of the invention.

FIG. 2 is a cross-section view of the device shown in FIG. 1.

In the figures, a device is intended for treating the air using a volatile treating agent contained inside a permeable container 1. According to the present invention, the choice made by the designers has principally related to the use of a treating agent preferably kept in a liquid state, or similarly in a state in which it is able to be absorbed by a spongy mass. The treating agent is packaged by absorption inside a cohesive spongy body 2 housed inside the permeable container 1. Cohesive body will be understood to mean a body that has the characteristic of forming a mass of elements held to each other so as to constitute a unit, this cohesive mass being spongy by presenting the character of being able to become easily saturated with treating agent.

This cohesive body 2 is particularly made of a porous mass provided in a pad the volume of which occupies at least partially, and for example almost all the volume of a chamber 3 formed by an internal channel of the container 1, with no intermediate element between the cohesive body 2 saturated with treating agent in a liquid state and the permeable wall of the container 1. More particularly, the cohesive spongy body 2 occupies the volume of the chamber 3 except for a thin layer of air provided between the cohesive spongy body 2 and the wall of the chamber 3. The purpose of these arrangements is to facilitate the introduction of the cohesive spongy body 2 inside the chamber 3 by providing between them a space, which additionally promotes the release of the treating agent 1.

More particularly, the device of the invention, according to the alternative embodiment shown, includes the permeable container 1 directly receiving the cohesive absorbing body 2. It will be understood that this direct reception is to be taken as meaning without any element interposed between the cohesive body 2 and the wall of the container 1. This cohesive body 2 is saturated with treating agent in a liquid state, particularly allyl-isothiocyanate, and is introduced inside the receiving chamber 3 comprising the permeable container 1.

The shaping of the cohesive body 2 is advantageously approximately complementary with that of the chamber 3, so as to optimise the occupation of the effective volume of the permeable container 1 except for a thin layer of air provided between the cohesive body 2 and the wall of the container 1. These arrangements allow the overall outer space requirement of the container to be reduced. By means of these arrangements, and the rigid character of the container 1, installing the latter onto a passenger compartment filter is thereby facilitated. In the embodiment example shown, the cohesive body 2 is shaped into a cylindrical pad formed from a textile felt.

The container 1 is fitted with a cap 4 for sealing the chamber 3, which the container 1 receives by fitting. This cap 4 is fitted forcibly inside the container 1, in the preferred case where the device is expendable.

The container 1 itself is rigid and is formed from a permeable plastic material, notably polypropylene, with a 20% talc filler.

In the end, an acceptable compromise proved to be, for an annual diffusion of 45 mg/day of treating agent, particularly allyl-isothiocyanate, at a constant temperature of about 40° C., a thickness Ep of the container 1 of about 0.9 mm plus or minus 20% for an overall surface of 4,200 $mm^2$ plus or minus 10%.

The following formulations cited as an example of extreme conditions of use are nonetheless given for information purposes.

According to a first example, for an annual diffusion of 5 mg/day of treating agent at 25° C., the characteristics of thickness and surface of the container 1 are determined by the following formulation:

$$S=(8.264*10^7)/\exp(-2.4204\,Ep+13.4398)$$

According to a second example, for an annual diffusion of 60 mg/day of treating agent at 10° C., the characteristics of thickness and surface of the container 1 are determined by the following formulation:

$S = (9.9173 * 10^8)/\exp(-3.0984\, Ep + 12.7633)$

It thereby emerges that from these two examples considered as extreme conditions of use, any ratio may be set between the thickness Ep and the diffusion surface of the container 1 for a given circumstance of use.

For information purposes and in respect of an annual usage, the cohesive spongy body 1 itself is of a volume of the order of 10,900 mm$^3$ and a density of 190 mg/cm$^3$, for a release of treating agent of about 45 mg/day at 40° C. According to the conditions of use and the nature of the absorbing material of the cohesive spongy body, the latter is able to be of a volume of between 4500 mm$^3$ and 50,000 mm$^3$ for a density of between 100 mg/cm$^3$ and 300 mg/cm$^3$.

It will be understood that the volume of the chamber 3 is to be considered in relation to that of the cohesive body 2, these volumes being substantially equivalent except for the space it is required to provide between the cohesive body 2 and the wall of the container 1.

The air treatment device is fastened for example to the medium of a passenger compartment filter, of the particle or activated charcoal type or a combination of the two, in an automobile vehicle so as to be at the heart of the air flow circulating through the filter. The latter is constituted by a peripheral edge or rigid or distortable frame which holds the filtering medium in its centre in a pleated form.

The air treatment device may also be fastened to the peripheral edge of the filter.

Positioning the air treatment device in this way on a filter that is itself installed inside a ventilation, heating and/or air conditioning installation allows any bacteria and odours arising inside this installation to be destroyed.

The container 1 includes an excrescence 5 which allows the air treatment device to be anchored to the filtering medium or to the peripheral edge using a clamp or an appropriate clip.

The device may thus be replaced each time the vehicle passenger compartment filter is changed or be reused by replacing it on the new filter medium of the installation. This treatment device is particularly adapted for use in manufacturers' motor vehicle repair networks or in independent after-sales networks.

The invention claimed is:

1. An air treatment device using a volatile treating agent contained inside a permeable container (1), wherein the treating agent is a liquid packaged by absorption inside a cohesive spongy body (2) occupying at least partially the available volume of a chamber (3) formed by an internal channel of the container (1);
   wherein the container (1) is a rigid container fitted with a cap (4);
   wherein the container (1) and the cap (4) enclose the cohesive spongy body (2) within the chamber (3);
   wherein the container (1) is a plastic material with a talc filler in a proportion of between 0% and 40% for a wall thickness of between 0.5 mm and 2 mm;
   wherein the plastic material constituting the container (1) is of the polypropylene type; and
   wherein, for a required annual diffusion X expressed in mg/day, the ratio between the thickness Ep and the diffusion surface S of the container (1) is established according to the following rule;
   $X = 6.05 * 10^{-8} * S * \exp((0.0452T - 15.89) * Ep + 0.0451T)$
   wherein:
   S is the diffusion surface of the container expressed in mm$^2$,
   Ep is the thickness of the container expressed in mm,
   T is the average ambient temperature expressed in degrees Kelvin.

2. An air treatment device according to claim 1, wherein the cohesive spongy body (2) is a textile material.

3. An air treatment device according to claim 1, wherein he cohesive spongy body (2) is constituted by any one of the elements including a blotter pad, a vegetable material body, a mineral material body, a cohesive mass of polymer powder, a leather of animal origin.

4. An air treatment device according to claim 1, wherein for an annual diffusion of 45 mg/day of treating agent at a constant temperature of 40.degree. C., the thickness Ep of the container (1) is of the order of 0.9 mm plus or minus 20%, for an overall diffusion surface S of 4200 mm$^2$ plus or minus 10%.

5. An air treatment device according to claim 1, wherein the cohesive spongy body is of a volume of the order of 10,900 mm$^3$ for a density of 190 mg/cm$^3$.

6. An air treatment device according to claim 1, wherein the container (1) is formed of a permeable material.

7. An air filter for a motor vehicle passenger compartment including a peripheral edge which holds a filtering medium; and
   an air treatment device using a volatile treating agent contained inside a permeable container (1), wherein the treating agent is a liquid packaged by absorption inside a cohesive spongy body (2) occupying at least partially the available volume of a chamber (3) formed by an internal channel of the container (1);
   wherein the container (1) is a rigid container fitted with a cap (4);
   wherein the container (1) and the cap (4) enclose the cohesive spongy body (2) within the chamber (3);
   wherein the container (1) is a plastic material with a talc filler in a proportion of between 0% and 40% for a wall thickness of between 0.5 mm and 2 mm;
   wherein the plastic material constituting the container (1) is of the polypropylene type; and
   wherein, for a required annual diffusion X expressed in mg/day, the ratio between the thickness Ep and the diffusion surface S of the container (1) is established according to the following rule:
   $X = 6.05 * 10^{-8} * S * \exp((0.0452T - 15.89) * Ep + 0.0451T)$
   wherein:
   S is the diffusion surface of the container expressed in mm$^2$,
   Ep is the thickness of the container expressed in mm,
   T is the average ambient temperature expressed in degrees Kelvin.

8. An air filter according to claim 7, wherein the cohesive spongy body (2) is a textile material.

9. An air filter according to claim 7, wherein the cohesive spongy body (2) is constituted by any one of the elements including a blotter pad, a vegetable material body, a mineral material body, a cohesive mass of polymer powder, a leather of animal origin.

10. An air filter according to claim 7, wherein for an annual diffusion of 45 mg/day of treating agent at a constant temperature of 40.degree. C., the thickness Ep of the container (1) is of the order of 0.9 mm plus or minus 20%, for an overall diffusion surface S of 4200 mm$^2$ plus or minus 10%.

11. An air filter according to claim 7, wherein the cohesive spongy body is of a volume of the order of 10,900 mm$^3$ for a density of 190 mg/cm$^3$.

12. An air filter according to claim 7, wherein the container (1) is formed of a permeable material.

13. A ventilating, heating and/or air conditioning installation for the passenger compartment of a motor vehicle wherein the ventilating, heating and/or air conditioning installation comprises:
- an air filter for a motor vehicle passenger compartment including a peripheral edge which holds a filtering medium; and
- an air treatment device using a volatile treating agent contained inside a permeable container (1), wherein the treating agent is a liquid packaged by absorption inside a cohesive spongy body (2) occupying at least partially the available volume of a chamber (3) formed by an internal channel of the container (1);

wherein the container (1) is a rigid container fitted with a cap (4);

wherein the container (1) and the cap (4) enclose the cohesive spongy body (2) within the chamber (3);

wherein the container (1) is a plastic material with a talc filler in a proportion of between 0% and 40% for a wall thickness of between 0.5 mm and 2 mm;

wherein the plastic material constituting the container (1) is of the polypropylene type; and wherein, for a required annual diffusion X expressed in mg/day, the ratio between the thickness Ep and the diffusion surface S of the container (1) is established according to the following rule:

$X = 6.05 \times 10^{-8} \times S \times \exp((0.0452T - 15.89) \times Ep + 0.0451T)$ wherein:

S is the diffusion surface of the container expressed in $mm^2$,

Ep is the thickness of the container expressed in mm,

T is the average ambient temperature expressed in degrees Kelvin.

14. A ventilating, heating and/or air conditioning installation according to claim 13, wherein the cohesive spongy body (2) is a textile material.

15. A ventilating, heating and/or air conditioning installation according to claim 11, wherein the cohesive spongy body (2) is constituted by any one of the elements including a blotter pad, a vegetable material body, a mineral material body, a cohesive mass of polymer powder, a leather of animal origin.

16. A ventilating, heating and/or air conditioning installation according to claim 13, wherein for an annual diffusion of 45 mg/day of treating agent at a constant temperature of 40.degree. C., the thickness Ep of the container (1) is of the order of 0.9 mm plus or minus 20%, for an overall diffusion surface S of 4200 $mm^2$ plus or minus 10%.

17. A ventilating, heating and/or air conditioning installation according to claim 13, wherein the cohesive spongy body is of a volume of the order of 10,900 $mm^3$ for a density of 190 $mg/cm^3$.

18. A ventilating, heating and/or air conditioning installation according to claim 13, wherein the container (1) is formed of a permeable material.

* * * * *

UNITED STATES PATENT AND TRADEMARK OFFICE
CERTIFICATE OF CORRECTION

| | | |
|---|---|---|
| PATENT NO. | : 7,578,873 B2 | Page 1 of 1 |
| APPLICATION NO. | : 11/296102 | |
| DATED | : August 25, 2009 | |
| INVENTOR(S) | : Gilles Elliot et al. | |

It is certified that error appears in the above-identified patent and that said Letters Patent is hereby corrected as shown below:

Column 5, line 61, after "rule" delete ";" and insert therein -- : --.

Column 8, line 10, after "claim" delete "11" and insert therein -- 13 --.

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,578,873 B2
APPLICATION NO. : 11/296102
DATED : August 25, 2009
INVENTOR(S) : Elliot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Seventh Day of September, 2010

David J. Kappos
*Director of the United States Patent and Trademark Office*